W. WENDERHOLD.
FILM EXPANDING PRESSURE GUIDE.
APPLICATION FILED JUNE 9, 1917.

1,373,925.

Patented Apr. 5, 1921.

INVENTOR
William Wenderhold
BY
ATTORNEY

UNITED STATES PATENT OFFICE.

WILLIAM WENDERHOLD, OF NEW YORK, N. Y., ASSIGNOR TO CRU PATENTS CORPORATION, A CORPORATION OF NEW YORK.

FILM-EXPANDING PRESSURE-GUIDE.

1,373,925.  Specification of Letters Patent.  Patented Apr. 5, 1921.

Application filed June 9, 1917. Serial No. 173,764.

*To all whom it may concern:*

Be it known that I, WILLIAM WENDERHOLD, a citizen of the United States, residing at New York city, in the county and State of New York, have invented certain new and useful Improvements in Film-Expanding Pressure Guides, of which the following is a clear, full, and exact description.

The object of my invention is to provide means which will spread the film when passing through an aperture guide in motion picture and photographic apparatus.

It is a well known fact that photographic films have a tendency to curve inwardly on the side carrying the photographic emulsion and the films must not touch any guides where the picture is or where it is about to be taken, on account of which facts a slight clearance is allowed between the usual guides. However, within this space the film generally curls slightly which disturbs the focal distances. It is therefore my object to keep the film flat at all places while passing through the aperture guide and maintain a non-curling surface.

Referring to my drawings, which form part of this specification,

Figure 2:
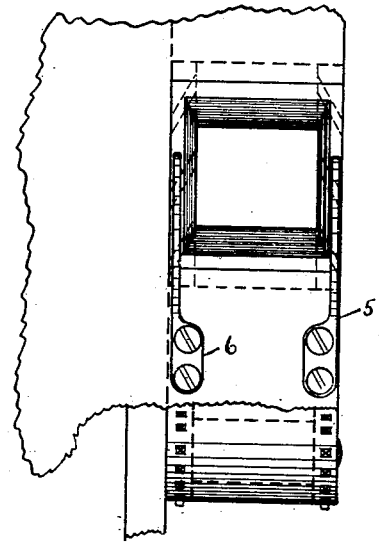
Fig. 2 is a view facing the aperture.
Figure 1:
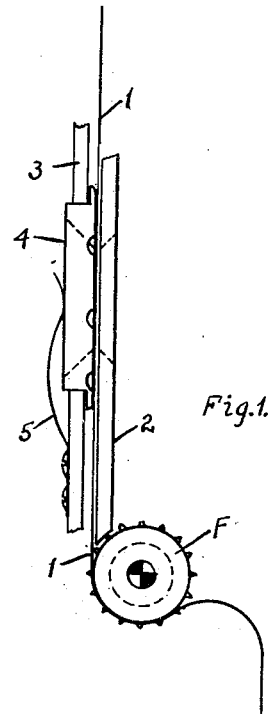
Figure 1 is a side elevation of my improved pressure guides.
Figures 3, 4:
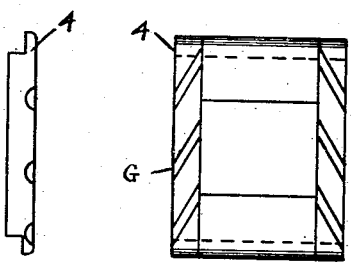
Fig. 3 is a side elevation of one guide.
Fig. 4 is a front elevation of the guide.

As shown in Fig. 1, F is a film feed roller pulling the film 1 through the guide 2 in the usual aperture plate. The rear guide 3 carries the tension shoe 4 which is under pressure from the springs 5 and 6.

My invention relates particularly to the construction of the guides and to hold said film taut at all times in said guides, I simply provide grooves G in the guide which run at an angle from the inside edge of the guide to the outer edge of the guide. This angular arrangement of the grooves tends to draw the film toward the outer edges of the guides and thereby hold the film taut. It must be understood that the groove must run from the inside at an angle to the edge in the same direction that the film is moving. It is also understood that all guides can be provided with such grooves, and can be constructed of metal or of anti-friction material.

What I claim is:

1. A film guide member having inclined grooves to engage a film when fed through the guide, said grooves operating to draw the film taut.

2. A film guide having a member formed with a groove inclined to the line of travel of the film guide, and arranged to engage the film to draw the same taut when it is drawn through the guide.

3. A film guide having a pair of members formed with inclined grooves to engage the film and draw the same taut when it is drawn through the guide.

4. The combination with a film feeding means, of a film guide having fixed and movable members, the movable members having grooves to engage the film as it is fed through the guide and operating to spread the same.

5. A film guide having a member formed with a groove inclined from the inner to the outer edge thereof and in the direction of feed of the film, said groove arranged to engage the film and hold the same taut.

Signed at the city of New York, New York, this seventh day of June, one thousand nine hundred and seventeen.

WILLIAM WENDERHOLD.